E. C. GADDINI.
TRACTION WHEEL.
APPLICATION FILED FEB. 8, 1919.
1,363,403.
Patented Dec. 28, 1920.
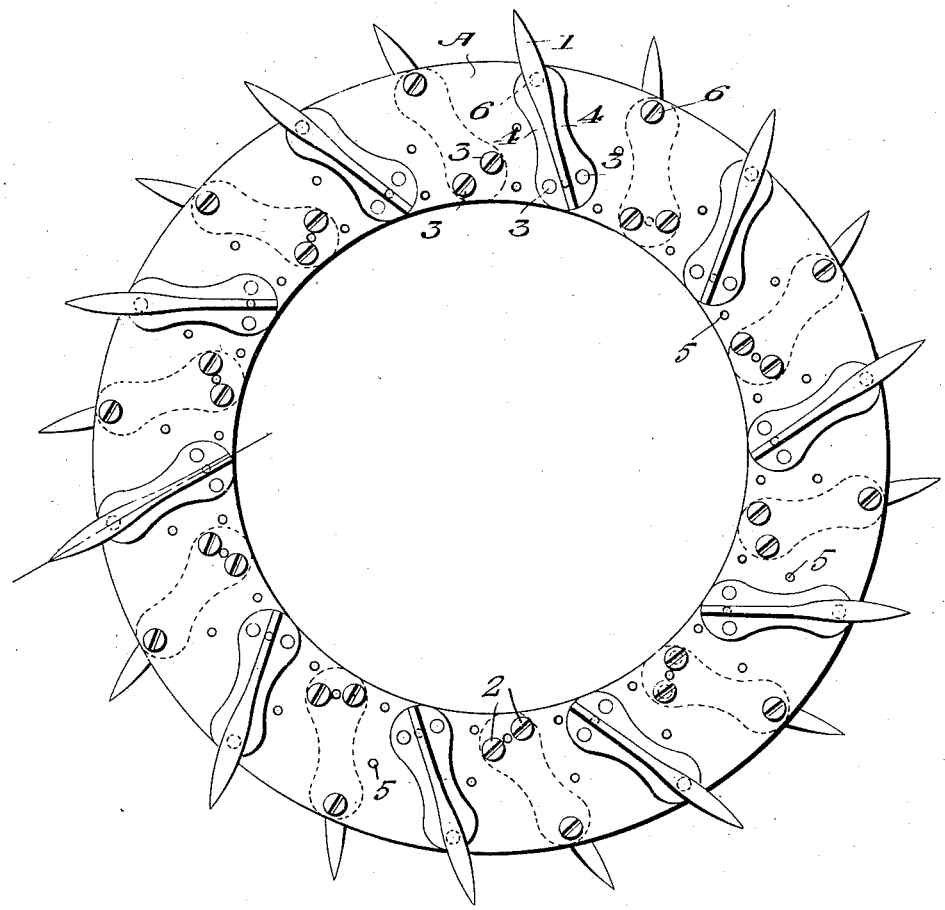
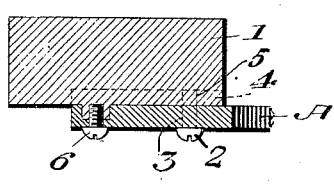

UNITED STATES PATENT OFFICE.

ERNEST C. GADDINI, OF NAPA, CALIFORNIA.

TRACTION-WHEEL.

1,363,403.  Specification of Letters Patent.  Patented Dec. 28, 1920.

Application filed February 8, 1919. Serial No. 275,776.

*To all whom it may concern:*

Be it known that I, ERNEST C. GADDINI, a citizen of the United States, residing at Napa, in the county of Napa and State of California, have invented certain new and useful Improvements in Traction-Wheels, of which the following is a specification.

My invention relates to an improvement in wheels, more particularly adapted for farm tractors.

The object is to obtain proper traction.

Nearly all tractor wheels of modern type clog up with mud, soft earth and weeds, so that they do not give the required traction to run the machine. My present invention is calculated to overcome this, and it comprises a rim having chisel-shaped projections which always grip the earth firmly, while the rim of the wheel itself prevents the tractor from sinking too deep. At the same time, the chisel-shaped pieces will also incidentally, perform a beneficial service by stirring the ground to some extent.

In the accompanying drawings:

Figure 1 is a view in side elevation;

Fig. 2 is a sectional view;

Figs. 3 and 4 are detached views of one of the chisel-shaped teeth.

A, represents the rim of the wheel, and numeral 1 indicates the chisel-shaped lugs. These are all, preferably, substantially alike, and a number of them are used in staggered form on opposite sides of the rim, and they are preferably tangentially arranged as shown, they being secured by bolts or screws, two passing through the holes 3 in the base flanges 4 and through holes 5 in the rim.

The lugs are not only removable by taking out the bolts or screws, but also adjustable, and to facilitate this the outer screw or bolt 6 which may pass partly or entirely through the lugs may serve as a pivot in adjusting the lugs, for instance to change the angle or to reverse them, as the case may be.

Since the lugs are easily removable, as they become worn they may be renewed or replaced by simply removing the bolts or screws and attaching another, or a repair lug, as the case may be.

In this way I have provided a simple wheel of few parts which will give the desired traction, and owing to its construction with a central rim and lugs or teeth in staggered arrangement on either side thereof, the tendency to fill and pack with mud, soft earth and weeds or stones is reduced to a minimum.

I claim:

1. A traction wheel comprising a rim provided with a plurality of flanged lugs pivoted at their forward ends to the sides of the rim adjacent to the periphery thereof, said rim being provided with a plurality of sets of spaced openings to receive fastening means carried by the flanged lugs at their inner ends, whereby the angle may be varied or the lugs may be removed.

2. A traction wheel comprising a rim having comparatively broad sides, a plurality of flanged lugs arranged in staggered relation and pivoted at their forward ends to the sides of the rim adjacent to the periphery thereof, said rims being provided with a plurality of sets of spaced openings, and fastening means carried by the flanges of the lugs at the rear thereof and registering with spaced openings, whereby the angle of the lugs may be varied, the fastening and pivoted means of alternate lugs accessible from opposite sides of the rim.

In testimony whereof I affix my signature.

ERNEST C. GADDINI.